(No Model.) 2 Sheets—Sheet 1.
H. BREER.
APPARATUS FOR TREATING ANIMAL MATTER FOR FERTILIZERS.
No. 274,901. Patented Apr. 3, 1883.
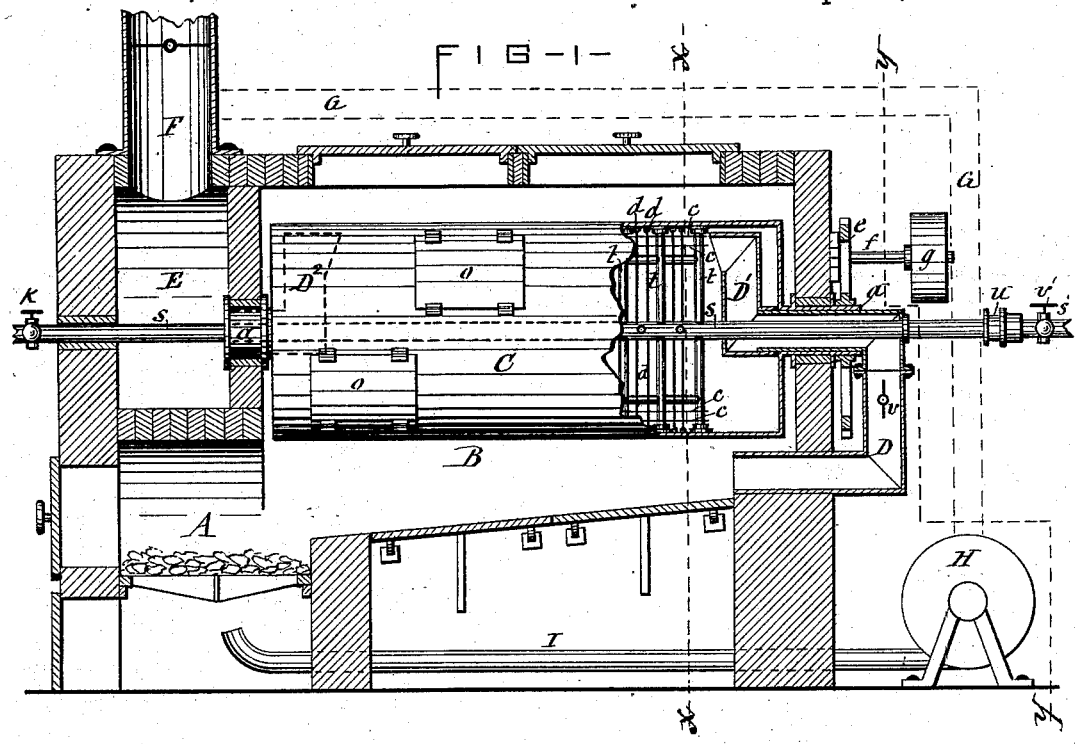
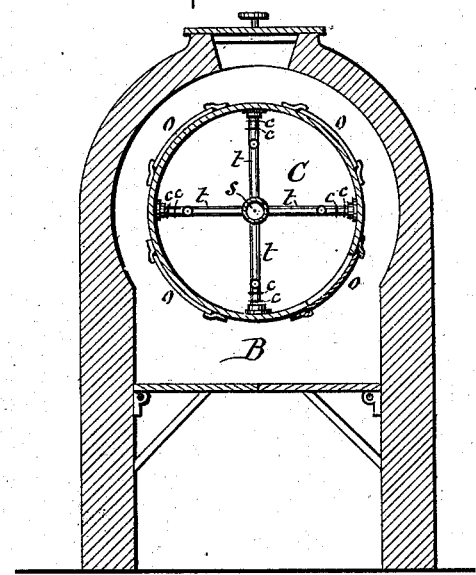
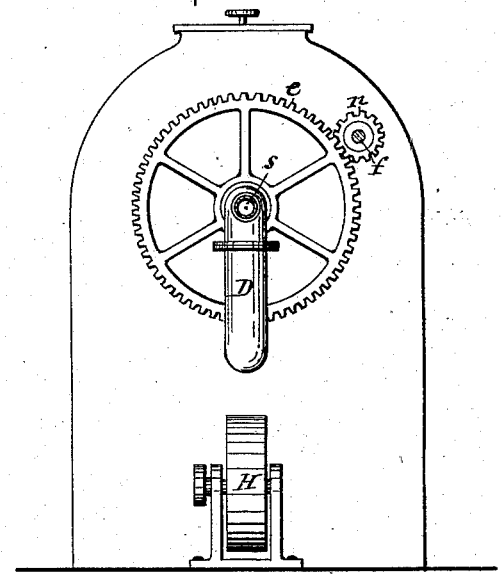
WITNESSES — INVENTOR —

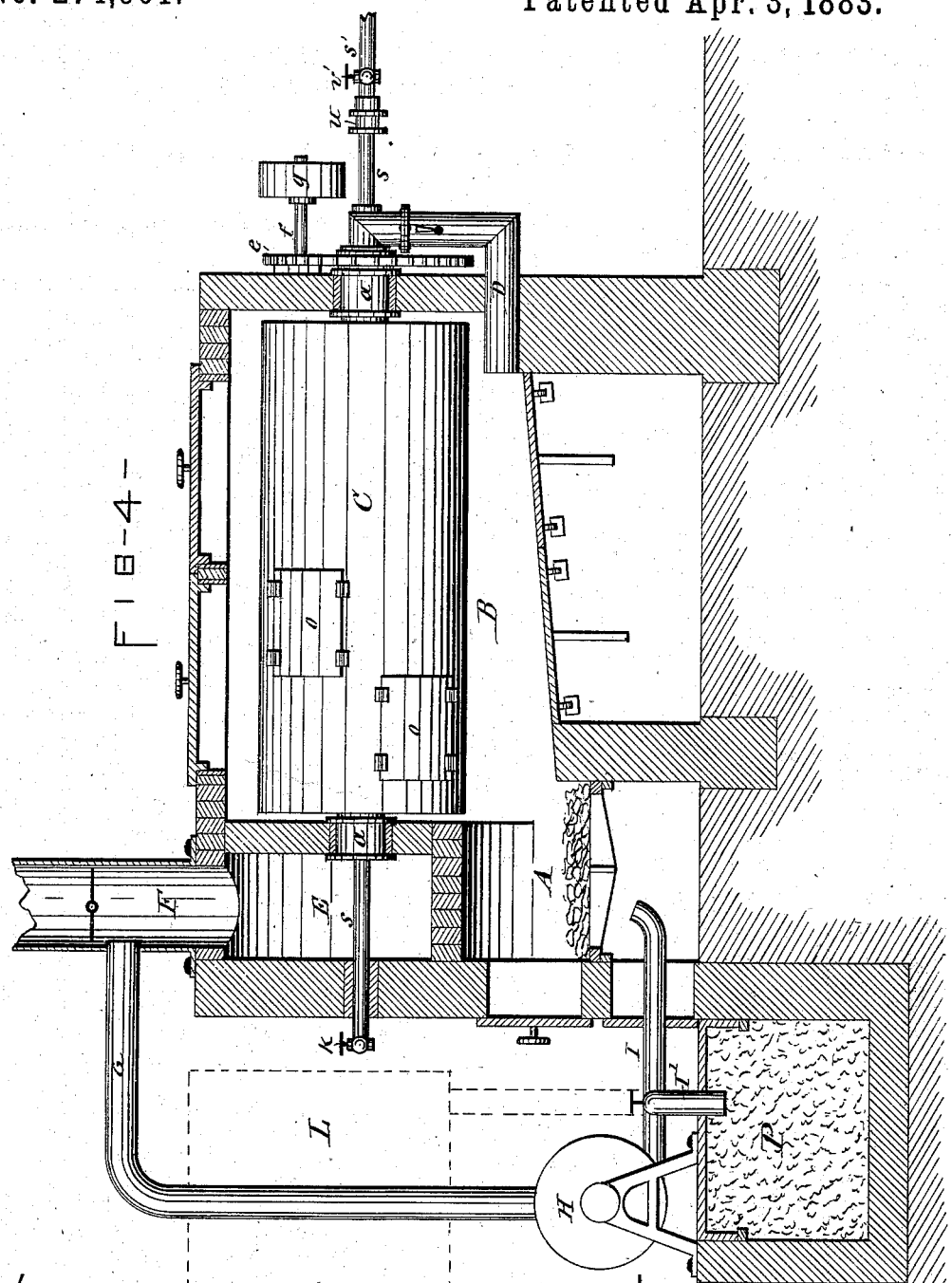

UNITED STATES PATENT OFFICE.

HENRY BREER, OF SYRACUSE, NEW YORK, ASSIGNOR TO CAROLINE H. BREER, OF SAME PLACE.

APPARATUS FOR TREATING ANIMAL MATTER FOR FERTILIZERS.

SPECIFICATION forming part of Letters Patent No. 274,901, dated April 3, 1883.

Application filed July 10, 1882. (No model.)

*To all whom it may concern:*

Be it known that I, HENRY BREER, of Syracuse, in the county of Onondaga, in the State of New York, have invented new and useful Improvements in Apparatus for Treating Animal Matter for Fertilizers, of which the following, taken in connection with the accompanying drawings, is a full, clear, and exact description.

This invention relates to a novel construction of an apparatus adapted for either steaming, boiling, or desiccating animal matter for fertilizer, and designed to dispel the odor incident to the aforesaid process of manufacturing fertilizer.

Referring to the annexed drawings, Figure 1 is a longitudinal vertical section of my invention; Fig. 2, a transverse section on line $x\ x$; Fig. 3, a transverse section on line $y\ y$, and Fig. 4 illustrates the disinfecting devices for expelling the odor arising during the treatment of the animal matter.

Like letters of reference designate like parts in all the figures.

A represents a fire-arch or furnace arranged at the end of the elongated combustion-chamber B, in which latter is situated a horizontal revolving cylinder, C, provided at its extremities with annular heads, on which are tubular trunnions $a\ a$, by which said cylinder is mounted in suitable bearings secured to opposite ends of the combustion-chamber. From the rear end of the combustion-chamber B is extended a flue or pipe, D, which passes through the rear trunnion $a$ of the cylinder, and terminates in the cylinder preferably with a radial branch pipe, D′, as seen in Fig. 1 of the drawings, a similar pipe, D², being connected to the inner end of the trunnion, $a$, at the opposite end of the cylinder, to allow the products of combustion which are conducted to the interior of the cylinder C to the flue D D′, to escape to the smoke-box E and out through the stack F, connected to the smoke-box E, in the usual manner. The branch-pipe D′, I fit with a loose joint to the end of the pipe D, so as to allow it to be turned downward when desired, for the purpose hereinafter explained.

Longitudinally through the center of the cylinder C is extended a steam-pipe, $s$, which at one end is connected with a suitable steam-generator, (not shown in the drawings,) and has its front end protruding through the front of the smoke-box E, and provided with a blow-off cock, K, through which to expel the condensed steam from the pipe $s$. The pipe $s$ is sustained in its position by radial branch pipes $t$, extending therefrom, and having closed extremities firmly secured to the inner sides of the cylinder. The branch pipes $t\ t$ also form spider-arms, which serve to brace the cylinder and to sustain the longitudinal wires $c\ c$, which are connected to said pipes, and, in conjunction with the same and with rods $d\ d$, extending diametrically across the cylinder between the branch pipes $t$, operate to stir and break up the substance under treatment.

The steam-pipe $s$, revolving with the cylinder C, is provided with a suitable joint, $u$, which allows it to turn on its stationary extension S′.

The flue D and steam-pipe S′ are provided respectively with a valve, $v\ v'$, by means of which either may be closed while the other is opened, or both ends opened to admit simultaneously the products of the combustion from the furnace and the steam from pipe S′.

The cylinder C is provided in its side with a number of ports closed by suitable removable covers, $o\ o$, and the combustion-chamber is provided on top and bottom with openings closed by doors or covers, which can be removed to give access to the cylinder C.

The substance to be treated is introduced in the cylinder through the upper openings in the combustion-chamber and through the ports of the cylinder, the covers being then applied to the respective openings and firmly secured in position until after the completion of the drying or steaming process. The lower doors of the combustion-chamber are then opened and the covers $o$ of the lower portion of the cylinder removed to allow the contents of the cylinder to drop out of the same. The cylinder is provided on its end with a spur-gear, $e$, in which meshes a pinion, $n$, attached to a shaft, $f$, journaled in a suitable bearing on the rear end of the combustion-chamber. A pulley, $g$, attached to the outer end of the shaft f, and a belt extended from said pulley to the motor, serves to impart the requisite rotary motion to the cylinder.

To the stack F, I connect a pipe, G, extended to the induction-port of a blower, H, the discharge of which I either direct under the grate of the furnace A by a suitable duct, I, so as to force the noxious gases issuing from the cylinder C during the treatment of the animal matter through the fire, and thus cause said gases to be consumed, or extend the discharge-pipe I' of the blower to a pit, P, or tank or chamber L, charged with any suitable disinfectant material, as illustrated in Fig. 4 of the drawings.

The operation of my invention is as follows: When the animal matter is to be steamed or boiled it is introduced into the cylinder C with the requisite amount of water. The ports of the cylinder and combustion-chamber being then properly closed, the valve $v$ of the fire-flue D and the valve $v'$ of the steam-pipe are opened to allow the products of combustion to pass through the cylinder and the steam to pass into the pipe $s$ and its branch pipes $t$, the water of condensation being emitted from the end of the pipe $s$ by the blow-off cock or water-cock K. The cylinder C, being at the same time set in motion, causes the radial pipe $t$, in conjunction with rods $d\ d$ and the wires $c\ c$, to stir and break up the substance under treatment. The blower H, being also in motion, draws the smoke, together with the vapors or steam and its attendant odor, from the cylinder C, and blows the same into either the fire of the furnace or into the disinfectant tank or pit, as may be desired. When it is desired to dry the cooked substance the remaining moisture is expelled therefrom by turning the pipe D' downward, so as to bring its mouth submerged in the substance under treatment. The blower, being kept in operation, causes the products of combustion to pass through the aforesaid substance and pass out through the pipe $D^2$, which is above the surface of the substance under treatment. The aforesaid current of the products of combustion carries away the moisture and its attendant odor and dispels the same in the manner hereinbefore described.

I am aware of the use of a jacketed vessel in combination with a tubular agitator for the circulation of steam or heated air, and I therefore do not claim, broadly, the combination, with the cylinder C, of the flues and pipe carrying into said cylinder respectively the products of combustion and steam; but What I do claim is—

1. The combination of a furnace, a combustion-chamber, a horizontal rotary cylinder in said combustion-chamber, and having hollow trunnions, a flue extended from the combustion-chamber to one of the hollow trunnions, a steam-pipe extended longitudinally through the cylinder and provided with radial branch pipes and valves for controlling respectively the currents of the products of combustion and the steam, substantially as shown and set forth.

2. In connection with the furnace A, the revolving cylinder C, provided with hollow trunnions $a\ a$, the flue D, and the pipe D', extended radially from said flue and adapted to be turned on its connection, substantially as and for the purpose set forth.

3. In combination with the cylinder C, ducts D D' $D^2$, and blower H, the disinfectant pit or chamber, substantially as described and shown.

In testimony whereof I have hereunto signed my name and affixed my seal, in the presence of two attesting witnesses, at Syracuse, in the county of Onondaga, in the State of New York, this 26th day of June, 1882.

HENRY BREER. [L. S.]

Witnesses:
K. HEY,
WM. C. RAYMOND.